(12) United States Patent
Nisius et al.

(10) Patent No.: US 10,310,104 B1
(45) Date of Patent: Jun. 4, 2019

(54) MEGAVOLT AND KILOVOLT X-RAY IMAGING FROM OPPOSITE SIDES OF A DETECTOR

(71) Applicant: Varex Imaging Corporation, Salt Lake City, UT (US)

(72) Inventors: David T Nisius, Des Plaines, IL (US); Richard E Colbeth, Los Altos, CA (US)

(73) Assignee: VAREX IMAGING CORPORATION, Salt Lake City, UT (US)

( * ) Notice: Subject to any disclaimer, the term of this patent is extended or adjusted under 35 U.S.C. 154(b) by 0 days.

(21) Appl. No.: 15/873,187

(22) Filed: Jan. 17, 2018

Related U.S. Application Data

(60) Provisional application No. 62/531,858, filed on Jul. 12, 2017.

(51) Int. Cl.
  *G01T 1/20* (2006.01)
(52) U.S. Cl.
  CPC .................................. *G01T 1/2018* (2013.01)
(58) Field of Classification Search
  None
  See application file for complete search history.

(56) References Cited

U.S. PATENT DOCUMENTS

| | | | | |
|---|---|---|---|---|
| 6,510,195 B1 * | 1/2003 | Chappo | ................. | G01T 1/2018 |
| | | | | 250/208.1 |
| 7,122,804 B2 | 10/2006 | Mollov | | |
| 2007/0025513 A1 * | 2/2007 | Ghelmansarai | ...... | A61N 5/1049 |
| | | | | 378/98.8 |
| 2009/0010389 A1 * | 1/2009 | Ma | ........................ | A61B 6/482 |
| | | | | 378/95 |
| 2013/0126743 A1 * | 5/2013 | Iwakiri | ................ | A61B 6/4216 |
| | | | | 250/366 |
| 2013/0173221 A1 * | 7/2013 | Buchheim | ................. | G01T 1/17 |
| | | | | 702/190 |
| 2014/0046212 A1 * | 2/2014 | Deutschmann | .......... | A61B 6/03 |
| | | | | 600/567 |
| 2016/0070004 A1 * | 3/2016 | Liu | ........................... | G01T 1/20 |
| | | | | 378/62 |

* cited by examiner

*Primary Examiner* — David P Porta
*Assistant Examiner* — Mamadou Faye
(74) *Attorney, Agent, or Firm* — Varex Imaging Corporation; Carla Jones

(57) ABSTRACT

In one embodiment, a radiation detector may include a housing, a scintillator, a photosensor array, and a first converter. The housing may include a first image cover associated with a first surface configured to receive incident radiation generated at a first voltage range, and a second image cover associated with a second surface configured to receive incident radiation generated at a second voltage range. The first voltage range may be different than the second voltage range. The scintillator may be disposed within the housing to convert the incident radiation at the first voltage range or the incident radiation at the second voltage range into converted optical photons. The photosensor array may be optically interfaced with the scintillator to receive the optical photons from the scintillator. The first converter may be configured to interact with the incident radiation generated at the first voltage range.

21 Claims, 6 Drawing Sheets

MEGAVOLT AND KILOVOLT X-RAY IMAGING FROM OPPOSITE SIDES OF A DETECTOR

CROSS-REFERENCE TO RELATED APPLICATIONS

This application claims the benefit of U.S. Provisional Patent Application No. 62/531,858 filed Jul. 12, 2017, which is incorporated herein by reference in its entirety.

BACKGROUND

The present disclosure generally relates to X-ray imaging systems, including embodiments relating to detectors for an X-ray imaging system.

X-ray imaging systems typically include an X-ray tube, a detector, and a support structure, such as a gantry, for the X-ray tube and the detector. In operation, an imaging table, on which a patient or object is positioned, is located between the X-ray tube and the detector. The X-ray tube typically emits radiation, such as X-rays, toward the object. The radiation passes through the object on the imaging table and impinges on the detector. As radiation passes through the object, internal structures of the object cause intensity variances in the radiation received at the detector. The detector receives the radiation and transmits data representative of the received radiation. The system translates the radiation variances into an image, which may be used to evaluate the internal structure of the object. The object may include, but is not limited to, a patient in a medical imaging procedure and an inanimate object in a package scanner.

The claimed subject matter is not limited to embodiments that solve any disadvantages or that operate only in environments such as those described above. This background is only provided to illustrate examples of where the present disclosure may be utilized.

DETAILED DESCRIPTION

Figure 1:
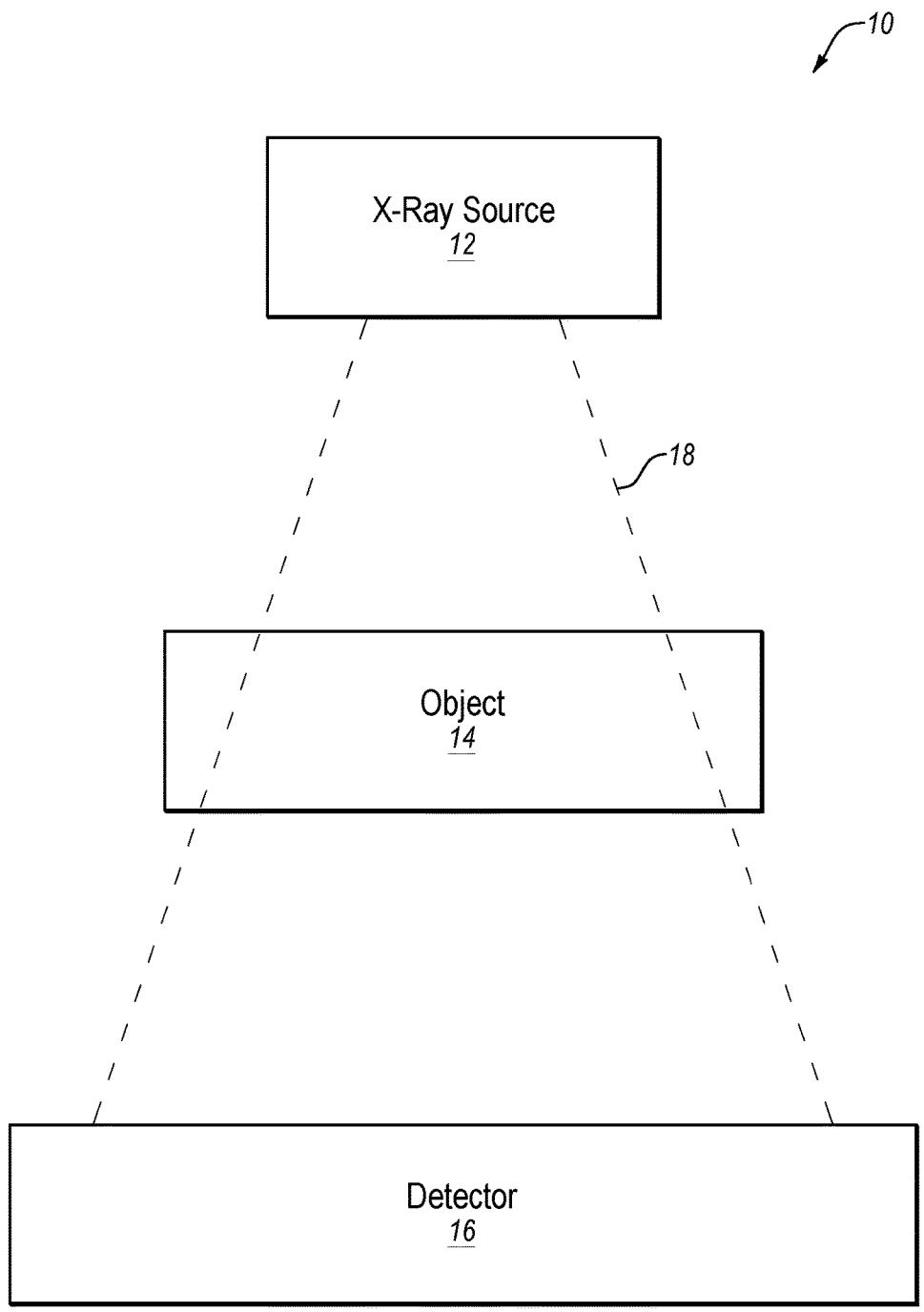
FIG. 1 is a schematic view of an example embodiment of an X-ray imaging system.

Reference will be made to the drawings and specific language will be used to describe various aspects of the disclosure. Using the drawings and description in this manner should not be construed as limiting its scope. Additional aspects may be apparent in light of the disclosure, including the claims, or may be learned by practice.

The present disclosure generally relates to X-ray imaging systems, including embodiments relating to radiation detectors for an X-ray imaging system. One type of radiation detector that may be implemented in X-ray imaging systems is a flat panel detector. Indirect sensing detectors may include a layer of scintillator material that converts X-rays into light (or other suitable electromagnetic radiation). A photosensor array, such as an amorphous silicon detector array, may be positioned so as to be optically coupled to the scintillator material. The detector array may include a grid of pixels, and each pixel may include a photodiode that generates an electrical signal in proportion to the light produced by the portion of scintillator layer in front of the pixel. The signals from the photodiodes are amplified and encoded by electronics in order to produce a digital representation of the X-ray image. In some configurations, the amplifying and encoding electronics of a detector are positioned behind the detector array. In such configurations, the radiation detector may only be used to detect X-rays in a single direction and at relatively low radiation energy levels (e.g., X-rays generated from a kilovolt X-ray source).

The potential of an X-ray tube is the maximum filed that electrons are accelerated through, and is generally denoted in kilovolts (kV) or megavolts (MV). The electrons have an energy that corresponds to the potential, generally denoted in kilo electron volts (keV) or mega electron volts (MeV). So for example, a 450 kV X-ray tube accelerates electrons to 450 keV. When the accelerated electrons impact a target of the X-ray tube, X-ray photons are produced, resulting in X-ray radiation which may be detected by the radiation detector. The energy of the X-ray photons corresponds to the energy of the accelerated electrons and the potential of the X-ray tube. In particular, the energy of the X-ray photons may range between a few keV up to the end point energy of the electrons. For example, for 450 kV X-ray tube that accelerates electrons to 450 keV, the X-ray photons may range between a few keV and 450 keV. Thus, the energy of the X-ray radiation of the X-ray tube corresponds to the voltage applied to the X-ray tube.

Generally, radiation detectors may be configured to detect X-rays with certain energy or ranges of energy. Typically, two different detectors are used for the two different energy or voltage ranges (referred to herein as "megavolt" and "kilovolt"). Megavolt voltage or kilovolt voltage refers to voltage ranges applied at the X-ray source to generate X-rays ("megavolt voltage range" or "kilovolt voltage range"). In some circumstances, kilovolt voltages or kilovolt voltage ranges may be less than 3 MV, between 0.001 MV and 3 MV, and/or between 60 kV and 150 kV. Megavolt voltages or megavolt voltage ranges may be greater than 3 MV, between 3 MV and 15 MV, and/or between 4 MV and 10 MV. Kilovolt energy refers to the energy of electrons or X-rays generated at kilovolt voltages. Megavolt energy refers to the energy of electrons or X-rays generated at megavolt voltages.

In some circumstances, megavolt imaging or megavolt detection refers to detection of X-rays of megavolt energy, or detection of X-rays generated at megavolt voltages. For example, megavolt imaging or megavolt detection may refer to detection of X-rays with end point energies of greater than 3 MeV of energy, between 3 MeV and 15 MeV, and/or between 4 MeV and 10 MeV. Kilovolt detection refers to detection of X-rays of kilovolt energy, or detection of X-rays generated at kilovolt voltages. For example, kilovolt imaging or kilovolt detection may refer to detection of X-rays with end point energies of less than 3 MeV, between 0.001 MeV and 3 MeV, and/or between 60 keV and 150 keV. In any event, the two different energy ranges are different, and are typically used for different X-ray imaging applications and/or X-ray dosages.

Megavolt detectors typically use a metal converter plate in contact with a scintillator such as gadolinium oxysulfide, $Gd_2O_2S$ (GOS), caesium iodide (CsI) or cadmium tungstate ($CdWO_4$ or CWO), which increases the dose capture efficiency by the capture of scatter electrons from the metal plate. However, when performing kilovolt imaging, this converter plate may actually decrease the dose capture efficiency. Accordingly, different detectors are typically used for kilovolt imaging and megavolt imaging.

The described embodiments may include a single flat panel detector that is capable of detecting X-rays and generating corresponding image data at both megavolt energy and kilovolt energy depending on the orientation of the detector with respect to the X-ray signal. For example, the described flat panel detectors may detect X-rays generated at a megavolt energy when received at one surface of the detector, and X-rays generated at a kilovolt energy when received at a second surface of the detector. In one embodiment, the two X-ray receiving surfaces are on opposite sides of the detector.

In certain configurations, amplifying and encoding electronics are positioned so as to not be directly in the path of the X-ray signal. In some configurations, the flat panel detectors may detect X-rays of one range of voltages or energies through one side of the detector, and may be configured to detect X-rays of a second range of voltages or intensities through the other side of the detector by merely flipping the detector over.

FIG. 1 is a schematic view of an embodiment of an X-ray imaging system 10 that may be used to acquire image data and process, display, and/or analyze the image data. The system 10 is an example of an operating environment where the concepts described in this disclosure may be implemented, but it is not limiting. The concepts described may be implemented in other X-ray imaging systems.

Referring to FIG. 1, the system 10 includes an X-ray source 12 that projects X-rays toward a detector 16 (e.g., a radiation detector or a flat panel detector) to scan an object 14 or a patient. The object 14 may be positioned such that X-rays from the X-ray source 12 pass through the object 14 and are received by the detector 16 to obtain information about the object 14. During operation, the X-ray source 12 may emit X-rays, denoted at 18, that travel through the object 14 to the detector 16. The detector 16 may produce electrical signals that represent the intensity of the impinging X-ray beam 18 and hence the attenuated beam as it passes through the object 14. Although the system 10 illustrated is configured to analyze the object 14, in alternative configurations the system 10 may be configured to analyze a patient rather than an object, or to deliver a dose of X-rays.

Figure 2A:
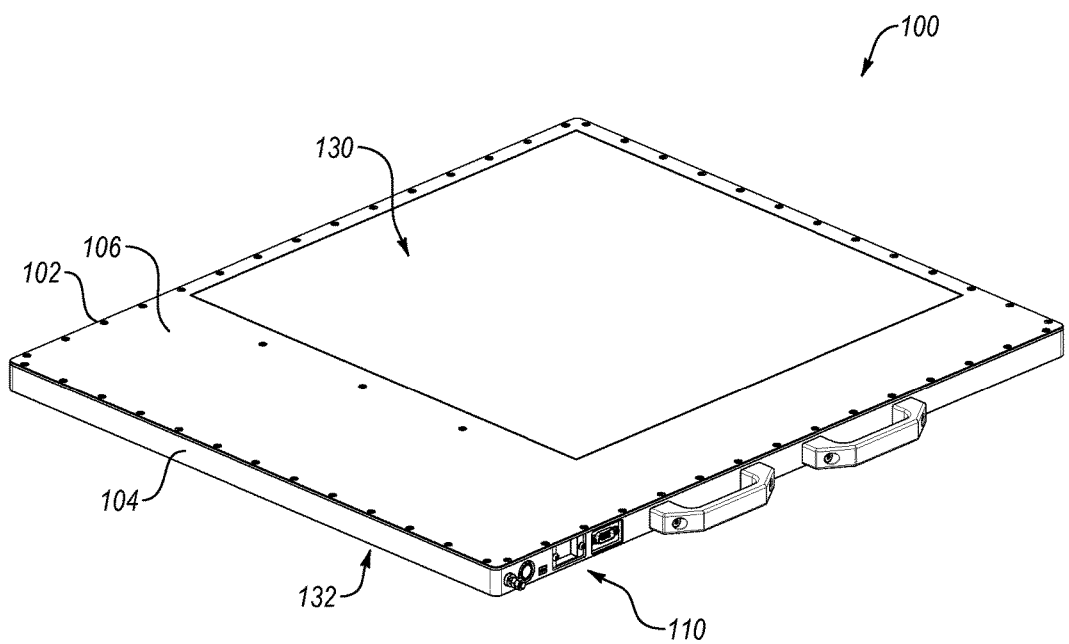
FIG. 2A is a top perspective view of an example embodiment of a detector.
Figure 2B:
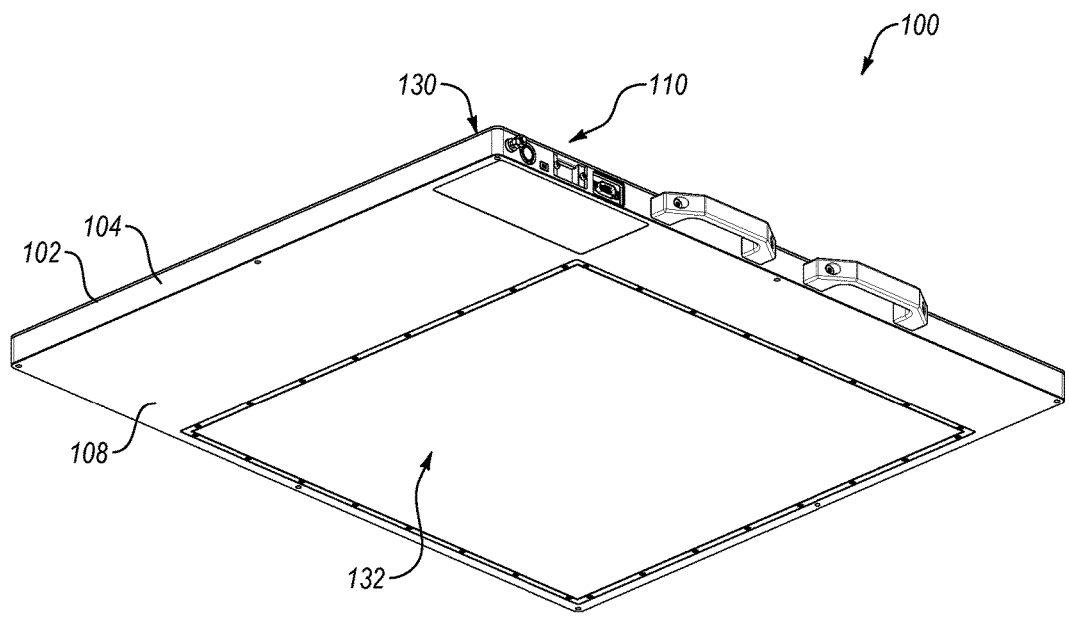
FIG. 2B is a bottom perspective view of the detector of FIG. 2A.
Figure 2C:
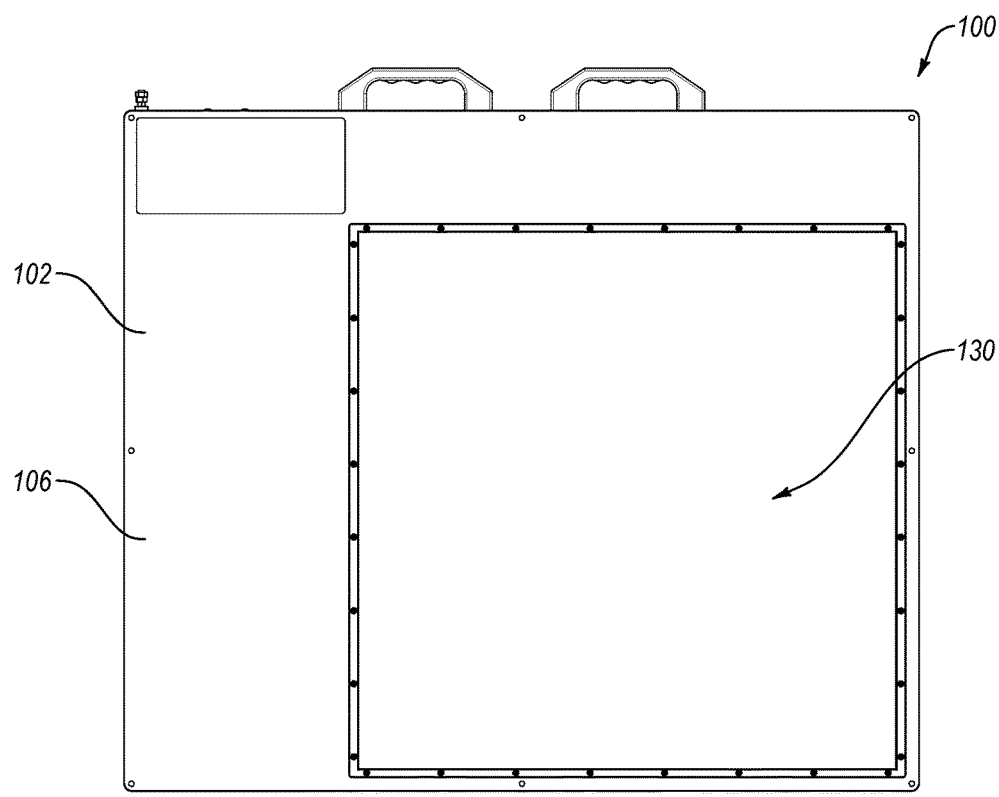
FIG. 2C is a top view of the detector of FIG. 2A.
Figure 2D:
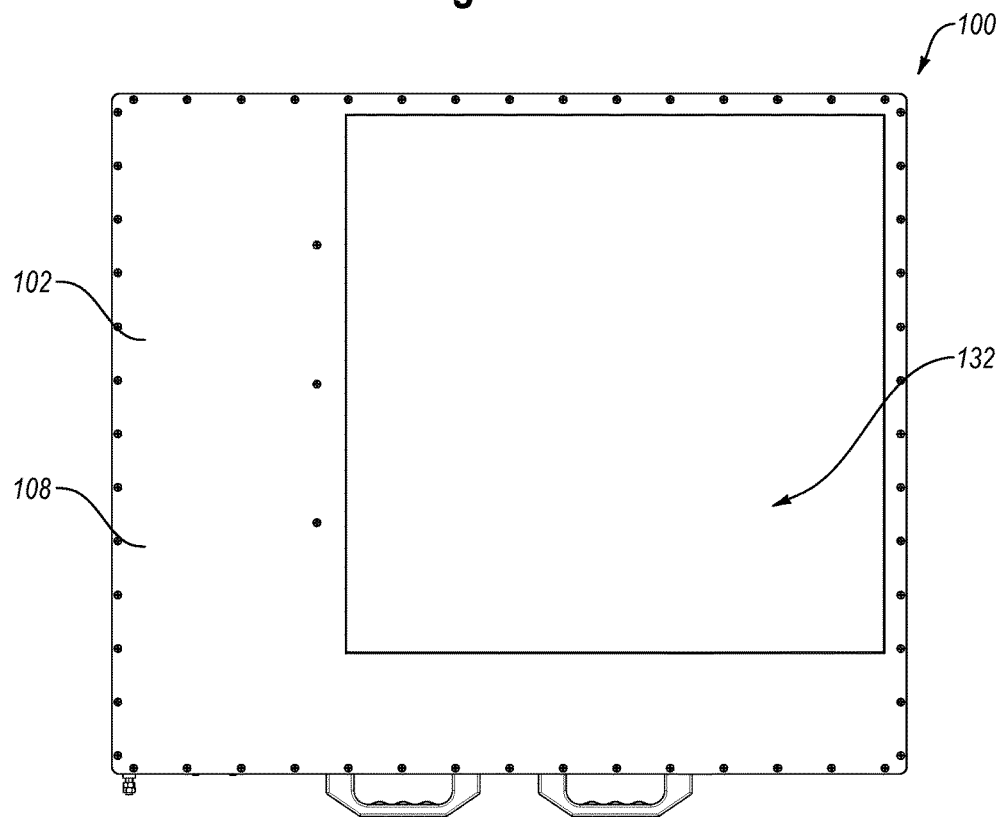
FIG. 2D is a bottom view of the detector of FIG. 2A.
Figure 2E:
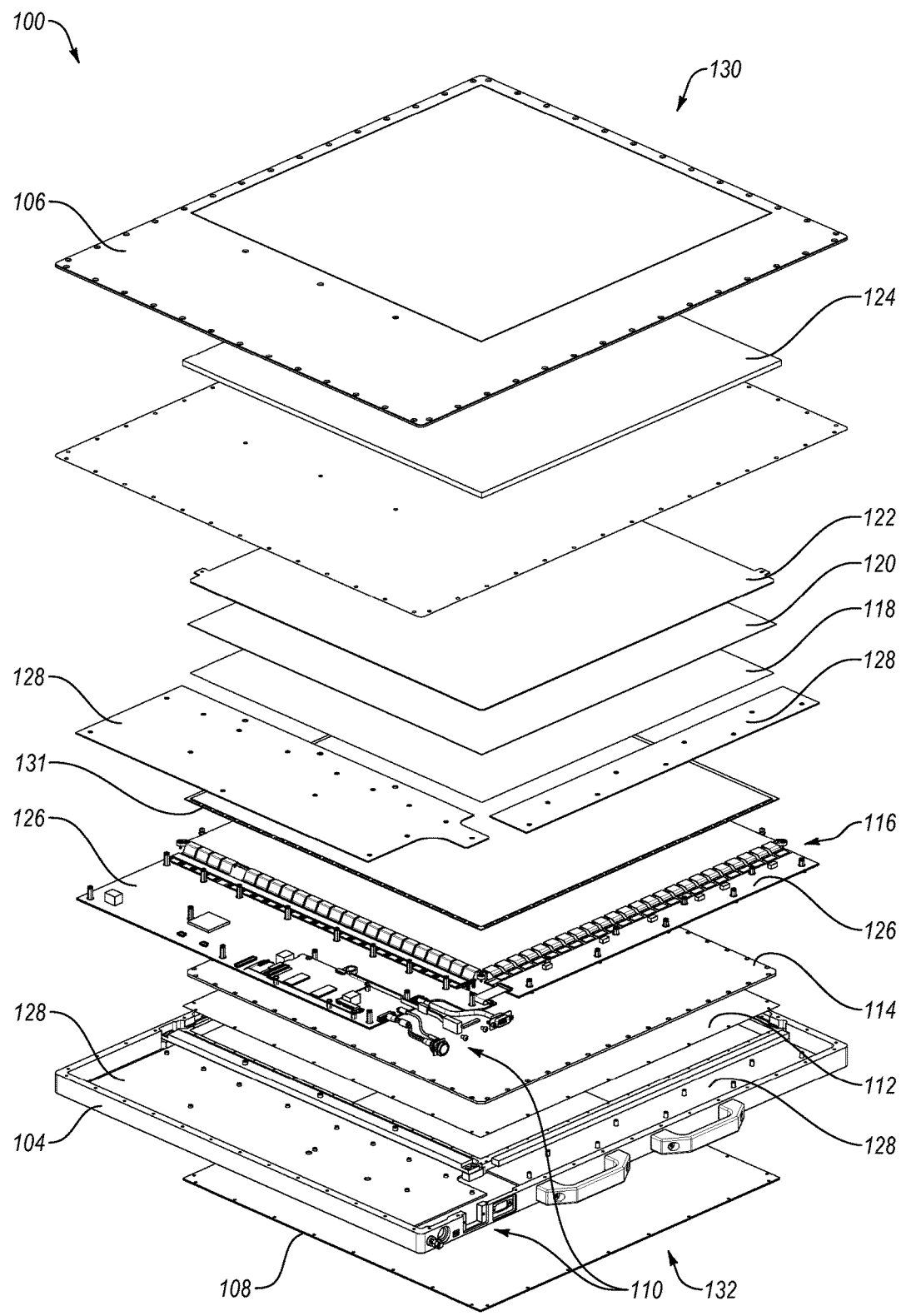
FIG. 2E is an exploded view of the detector of FIG. 2A.

FIGS. 2A-2E illustrate an example embodiment of a detector 100 (e.g., a radiation detector or a flat panel detector) according to the concepts described herein. In particular, FIG. 2A is a top perspective view, FIG. 2B is a bottom perspective view, FIG. 2C is a top view, FIG. 2D is a bottom view, and FIG. 2E is an exploded view of the detector 100.

As illustrated, for example, in FIGS. 2A-2D, the detector 100 may include a housing 102. The housing 102 may include a housing body 104, a top cover 106, and a bottom cover 108. In some configurations, the housing body 104 may be formed of a metal, such as aluminum (Al), or other suitable materials, such as carbon fiber. The detector 100 may include one or more ports 110 extending through the housing 102 into the interior of the housing 102. In some configurations, the ports 110 may include a power supply port, a ground port, a data port, and/or any suitable port arrangement.

The detector 100 may be configured to detect X-rays through either the top side of the detector 100 (see, for example, FIG. 2C), or through the bottom side of the detector 100 (see, for example, FIG. 2D), depending on the orientation of the detector 100 with respect to the X-ray source 12 (see FIG. 1). Accordingly, the top cover 106 and the bottom cover 108 may permit X-rays to travel therethrough with little to no attenuation of the X-rays, which can negatively affect detection of the X-rays. Additionally or alternatively, the top cover 106 and the bottom cover 108 may protect the components positioned inside of the housing 102. In such configurations, the material and thickness of the cover 106 and the cover 108 may be selected such that the cover 106 and the cover 108 minimally interacts with the X-rays travelling into either the top or the bottom of the detector 100. Additionally or alternatively, the material and thickness of the cover 106 and the cover 108 may be selected such that the cover 106 and the cover 108 are sufficiently rigid to protect components positioned inside of the housing 102.

For example, in some configurations, the cover 106 and the cover 108 may include or be formed of carbon fiber, polymer, aluminum (Al), magnesium (Mg) or other suitable materials. The cover 106 and/or the cover 108 may include any suitable thickness. For example, in some embodiments, the cover 106 and/or the cover 108 may be between 0.001 and 5 millimeters (mm) thick. Additionally or alternatively, the cover 106 may be formed of carbon fiber having a thickness of approximately 2.5 mm and the cover 108 may be formed of carbon fiber having a thickness of approximately 1.5 mm, although other suitable materials and thicknesses may be used.

Generally, attenuation of X-rays depends on the density and thickness of a material. In some configurations, carbon fiber, polymer, aluminum (Al), magnesium (Mg) or other suitable materials may have a sufficiently low density such that attenuation and scatter from the X-ray beam is minimized for the certain thicknesses, such as the examples described above. In other configurations, the cover 106 and/or the cover 108 may be formed of aluminum (Al) or magnesium (Mg), although other suitable materials may be implemented. Furthermore, the cover 106 and/or the cover 108 may have a thickness of approximately 1 mm, although other thicknesses may be implemented.

In other configurations, the cover 106 and/or the cover 108 may be combined with the baseplate 112. In such configurations, the cover 106 may be integral with the baseplate 112 or the cover 108 may be integral with the baseplate 112. In some circumstances, such configurations may be implemented with flexible detectors.

FIG. 2E is an exploded view of the detector 100 that further illustrates one exemplary embodiment of components inside of the housing 102. With attention to FIG. 2E, the interior features of the detector 100 will be described in further detail. As illustrated, the detector 100 includes a baseplate 112, a support layer 114, an array assembly 116, a scintillator 120, a screen layer 118, converter plate or layer 122, a support layer 124, circuit boards 126 and shielding components 128.

The array assembly 116 may include a detector array 131 (or a photosensor array) that includes a grid of pixels. Each of the pixels may include a photodiode that generates an electrical signal in proportion to the light produced by the portion of scintillator layer in front of the pixel. The signals from the photodiodes are amplified and encoded by electronics in order to produce a digital representation of the X-ray image. In some configurations, the detector array 131 may be configured as an amorphous silicon detector array. The array assembly 116 also includes circuit boards 126. In some configurations, amplifying and encoding electronics may be included on the circuit boards 126 (e.g., external to the detector array 131).

The baseplate 112 and the support layer 114 may be configured to support the array assembly 116 in the housing 102. The baseplate 112 may permit X-rays to travel therethrough without negatively affecting detection of the X-rays and/or may be sufficiently rigid to support the array assembly 116. In such configurations, the material and thickness of the baseplate 112 may be selected such that the baseplate 112 minimally interacts with the X-rays travelling into either the top or the bottom (first or second sides) of the detector 100 while being rigid enough to support the array assembly 116. In some configurations, the baseplate 112 may include or be formed of carbon fiber, polymer, aluminum (Al), magnesium (Mg) or other suitable materials and/or may include a thickness between 0.001 and 5 mm. For example, the baseplate 112 may be approximately 2.5 mm thick, although other suitable configurations may be implemented. In some configurations, carbon fiber polymer, aluminum (Al), magnesium (Mg) or other suitable materials may have a sufficiently low density such that attenuation and scatter from the X-ray beam is minimized for the certain thicknesses, such as the example described above.

The support layer 114 may be positioned between the baseplate 112 and the array assembly 116. The support layer 114 may be formed of a resilient material that facilitates in dispersing forces on the array assembly 116 and/or the detector 100. For example, the support layer 114 may be formed of a polymer, such as rubber. In some embodiments, some of the layers and/or components of the detector 100 may be combined with one another. For example, in some embodiments the support layer 114 may be combined with the top cover 106, the bottom cover 108 and/or the baseplate 112, although other suitable configurations may be implemented.

The scintillator 120 may be configured in a manner that is well known such that the radiation to be detected (e.g., X-rays or the like) penetrates the scintillator and is absorbed by the scintillator material in an event that results in the release of optical photons. The optical photons are received by the detector array 131 of the array assembly 116. In some configurations, the scintillator 120 may be formed of $Gd_2O_2S$ (GOS), caesium iodide (CsI), cadmium tungstate ($CdWO_4$ or CWO), although other configurations may be implemented. In some examples, the scintillator 120 may be columnar CsI, columnar GOS, or pixelated GOS. In some configurations, the screen layer 118 may be formed of crystalline silicon (c-Si), although other configurations may be implemented.

The converter plate or layer 122 may be configured to interact with the photons of the X-rays without blocking the X-rays completely. In particular, the converter plate 122 may interact with the scintillator 120 to increase the dose capture efficiency of the scintillator 120 by reducing the energy of the capture of scattered electrons from the converter plate 122. In some configurations, the converter plate 122 may be formed of copper or may include copper or similar materials. The converter plate 122 may include a thickness of between 0.001 and 4 mm. In one embodiment, the converter plate 122 is formed of copper, and has a thickness of approximately 1 mm. Again, the material and thickness are selected so as to provide a desired dose capture efficiency for the scintillator, and may vary depending on a given application. In other embodiments, converter plate 122 may be formed of molybdenum, lead, and/or other suitable materials.

The support layer 124 may be configured to support the components inside of the housing 102. In particular, the support layer 124 may support the converter plate 122 and/or the scintillator 120.

The shielding components 128 may be configured to shield the circuit boards 126 from X-ray radiation to protect electronic components positioned thereon. In some configurations, the shielding components 128 may be formed of and/or may include tungsten or a tungsten alloy, although other suitable materials may be implemented. Since the detector 100 is configured to receive X-rays from both the first side 130 and the second side 132, in the illustrated configuration the shielding components 128 are included on both sides of the circuit boards 126. Alternatively, shielding can be provided by a portion of the device (not shown) within which the detector is installed.

As mentioned above, megavolt detectors typically use a converter plate (e.g., 122) in contact with a scintillator (e.g., 120) which increases the dose capture efficiency by permitting the scintillator to capture scattered electrons from the converter plate. However, when performing kilovolt imaging, this converter plate may actually decrease the dose capture efficiency. Accordingly, two different detectors are typically used for the two different energy ranges (megavolt and kilovolt). However, the detector 100 may receive X-rays from both a first side 130 and a second side 132, with the first side 130 configured for megavolt imaging and the second side 132 configured for kilovolt imaging.

Accordingly, megavolt X-rays may travel into the detector 100 from the first side 130 and may travel through the converter plate 122 and the scintillator 120, which converts the X-rays into light signals, which are received by the array assembly 116. Alternatively, kilovolt X-rays may travel into the detector 100 via the second side 132 and may travel to the scintillator 120 without traveling through the converter plate 122, and thus the dose capture efficiency of the X-rays is not decreased for kilovolt imaging. In this way, the same detector 100 may be used for both megavolt and kilovolt imaging by merely re-orienting the detector 100 so that the appropriate surface receives the X-rays for a given energy.

In some circumstances, an aluminum baseplate is included in detectors to provide a mounting structure to the housing for the panel. The outer housing is also typically made of aluminum or other metal to provide structural integrity. However, in the illustrated configurations the baseplate 112, the cover 106, and/or the cover 108 may be formed of carbon fiber, which provides structural rigidity and does not interfere with X-rays in the configuration as shown.

Furthermore, in some medical imaging applications, the signal processing electronics in detectors are folded between the baseplate and a back wall of the housing (e.g., behind the detector array. In such circumstances, the detector can only be used from the front side, which typically has a carbon fiber faceplate to minimize X-ray attenuation and scatter from the primary beam into the detector sensitive area. In the illustrated configuration, the detector 100 can be used from both sides, and therefore carbon fiber may be used in the baseplate 112, the cover 106, and/or the cover 108.

Figure 3A:
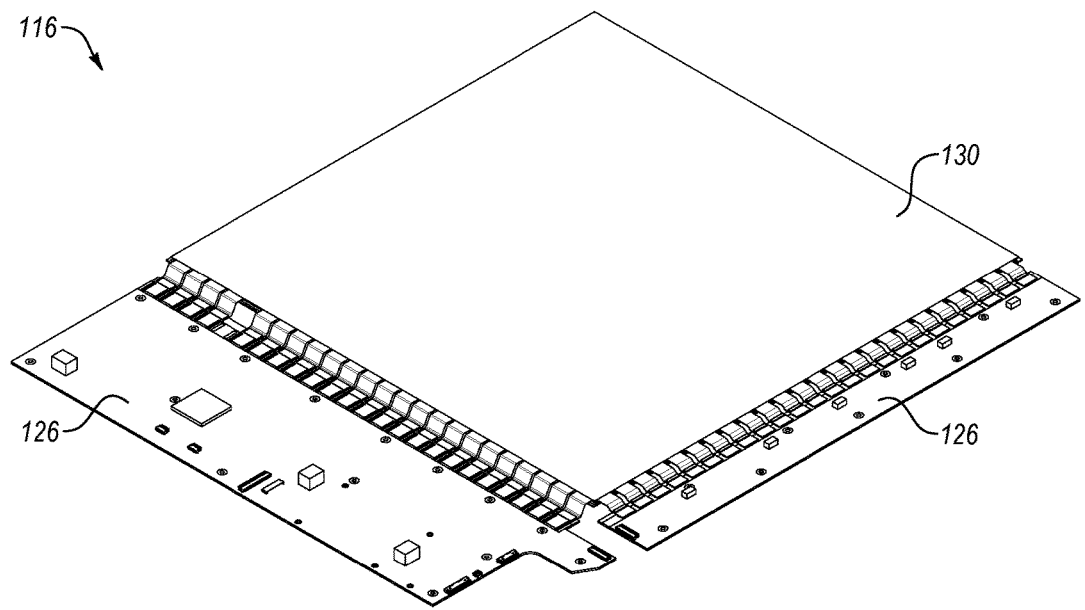
FIG. 3A is a top perspective view of an example embodiment of an array assembly that may be implemented in the detector of FIG. 2A.
Figure 3B:
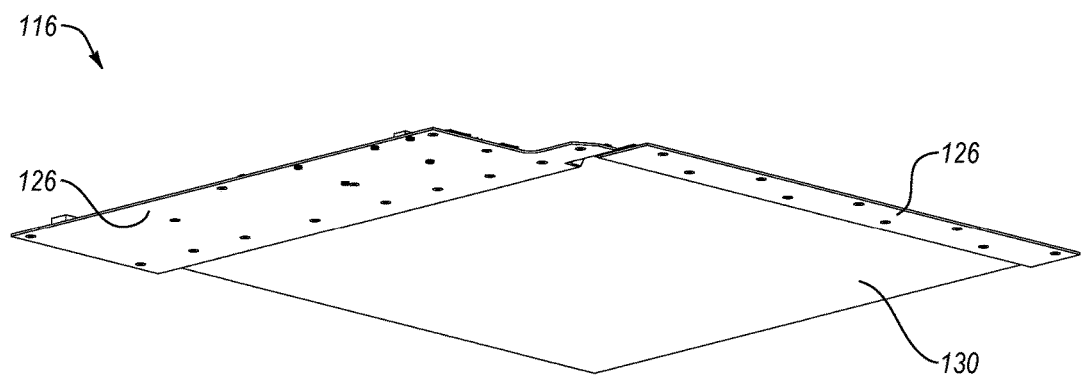
FIG. 3B is a bottom perspective view of the array assembly of FIG. 3A.

FIGS. 3A and 3B illustrate the array assembly 116 in further detail. FIG. 3A is a top perspective view and FIG. 3B is a bottom perspective view. As illustrated, the circuit boards 126 may be positioned substantially in the same plane as the detector array 131. Such configurations may permit the detector array 131 to detect X-rays from both sides of the detector array 131, and therefore the detector 100 may detect X-rays from both either a first surface (e.g., megavolt surface) or a second surface (e.g., a kilovolt surface).

Figure 4A:
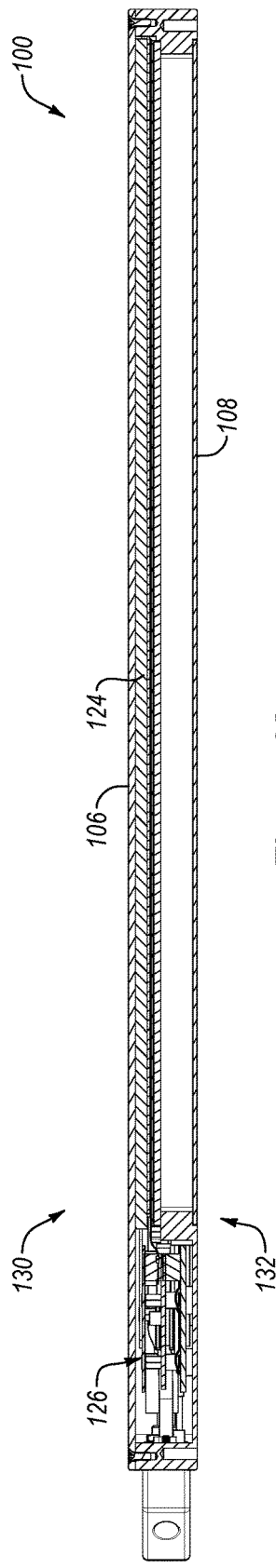
FIGS. 4A-4B are cross-sectional views of a portion of the detector of FIG. 2A.
Figure 4B:
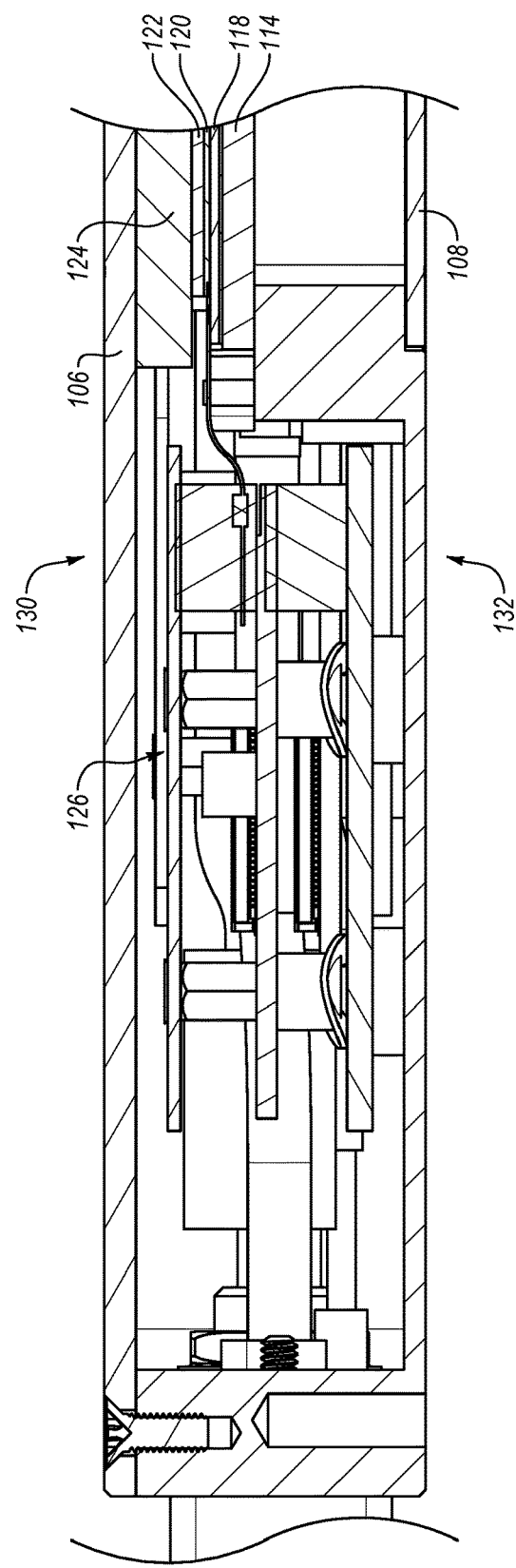

FIGS. 4A and 4B illustrate cross-sectional views of a portion of the detector 100 to further illustrate the positions of the different components of the detector 100 in an assembled state.

According to the embodiments described herein, amplifying and encoding electronics of the detector may be positioned in plane with the detector array. Additionally or alternatively, the baseplate is formed of carbon fiber to provide suitable mounting capabilities, but also reduces attenuation and scatter compared to other materials, such as aluminum. Additionally or alternatively, the outer housing (top and bottom covers) includes carbon fiber on both the front and backside of the housing in the active detection area to minimize attenuation and scatter.

According to the embodiments described herein, for megavolt imaging (a first surface), the primary megavolt X-ray beam may encounter the top cover, the converter plate, the scintillator then the detector array. Further, the megavolt X-ray beam may then encounter the baseplate and then finally the bottom cover. For kilovolt imaging, the kilovolt X-ray beam may encounter that same stack up in the reverse order. In particular, the detector may be flipped in such configurations, and therefore kilovolt X-ray beams may encounter the bottom cover, the baseplate, the detector array, the scintillator, the converter plate, and the top cover. In some configurations, the detector 100 may include two converter plates, one for kilovolt imaging and another for megavolt imaging. In such configurations, the megavolt side may have a thicker converter plate and/or a more dense material than the kilovolt side, although other configurations may be implemented.

In the configurations described herein, the detector 100 is optimized for megavolt imaging in one direction (top-down direction) and optimized for kilovolt imaging in the other, opposite direction (bottom-up direction). In particular, the converter plate on the top side of the detector array facilitates megavolt imaging from the first surface while minimizing X-ray attenuation for kilovolt imaging from the second surface.

In some circumstances, the kilovolt side of the detectors may be used as a megavolt detector, however, in such circumstances it may not have as high of a dose efficiency as the megavolt side of the detector.

In one example embodiment, a radiation detector (100) may detect incident radiation generated at a first voltage range and received at a first surface of the radiation detector (100). The radiation detector (100) may detect incident radiation generated at a second voltage range at a second surface of the radiation detector radiation detector (100). The first voltage range may be different than the second voltage range.

The radiation detector (100) may include a housing (102), a scintillator (120), a photosensor array (131), and a first converter (122). The housing (102) may include a first image cover (106) associated with the first surface configured to receive the incident radiation generated at the first voltage range. The housing (102) may include a second image cover (108) associated with the second surface configured to receive the incident radiation generated at the second voltage range. The scintillator (120) may be disposed within the housing (102) and may be configured to convert the incident radiation at the first voltage range or the incident radiation at the second voltage range into converted optical photons. The photosensor array (131) may be optically interfaced with the scintillator (120) and may be configured to receive the optical photons from the scintillator (120). The first converter (122) may be configured to interact with the incident radiation generated at the first voltage range.

The first converter (122) may include a material having an atomic number and dimensions such that the first converter (122) interacts with the incident radiation generated at the first voltage range so as to increase the dose capture efficiency of the scintillator (120) at the first voltage range. The first converter (122) may include copper (Cu), molybdenum (Mo), or lead (Pb). In some configurations, the first converter (122) may include copper and/or the first converter may be between 0.001 and 4 millimeters thick.

The radiation detector (100) may include a baseplate (112) configured to interact with the incident radiation generated at the second voltage so as to minimize attenuation of the energy of the incident radiation and provide structural support to the photosensor array (131). The baseplate (112) may include carbon fiber, polymer, aluminum, magnesium, or other suitable materials, and may be between 0.001 and 5 millimeters thick. The first image cover (106) may include carbon fiber, polymer, aluminum, magnesium, or other suitable materials, and may be between 0.001 and 5 millimeters thick. The second image cover (108) may include carbon fiber, polymer, aluminum, magnesium, or other suitable materials, and may be between 0.001 and 5 millimeters thick.

The radiation detector (100) may include amplifying and encoding electronics positioned on at least one circuit board (126) proximate the photosensor array. Shielding components (128) may be included to shield the circuit board (126) from X-ray radiation. The shielding components (128) may be positioned on two sides of the circuit board (126) to shield the circuit board (126) from X-ray radiation received through both the first image cover (106) and the second image cover (108).

In another embodiment, a radiation detector (100) may include a housing (102), a scintillator (120), a photosensor array (131), and a first converter (122). The housing (102) may include a first surface and a second surface. The scintillator (120) may be disposed within the housing (102) and may be configured to convert the incident radiation at the first energy range and the incident radiation at the second energy range into converted optical photons.

The photosensor array (131) may be optically interfaced with the scintillator (120) and configured to receive the optical photons from the scintillator (120). The first converter (122) may interact with the incident radiation generated at the first energy range. The incident radiation generated at a first energy range may be received through the first surface, and incident radiation generated at a second energy range may be received through the second surface. The first energy range may be different than the second energy range.

The first converter (122) may include a material having an atomic number and dimensions such that the first converter (122) interacts with the incident radiation generated at the first voltage range so as to increase the dose capture efficiency of the scintillator (120) at the first voltage range. The scintillator (120) may include a material that converts X-rays into light. The radiation detector (100) may include a baseplate (112) configured to interact with the incident radiation generated at the second voltage in a manner so as to minimize attenuation and provide structural support to the photosensor array (131). The baseplate (112) may include carbon fiber, polymer, aluminum, magnesium, or other suitable materials. The scintillator (120) may include a material that converts X-rays into light, such as gadolinium oxysulfide.

In another embodiment, a radiation detector (100) may detect incident radiation in a megavolt voltage or energy range from one side and incident radiation in a kilovolt voltage or energy range from another side. The radiation detector (100) may include a housing (102), a scintillator (120), a photosensor array (131), and a first converter (122). The housing (102) may include a first surface and a second surface. The scintillator (120) may be disposed within the housing (102) and may be configured to convert the incident radiation at the megavolt voltage or energy range and the incident radiation at the kilovolt voltage or energy range into converted optical photons. The photosensor array (131) may be optically interfaced with the scintillator (120) and may be configured to receive the optical photons from the scintillator (120). The first converter (122) may be configured to interact with the incident radiation generated at the megavolt voltage or energy range. The incident radiation generated at the kilovolt voltage or energy range may be received through the first surface, and incident radiation generated at the megavolt voltage or energy range may be received through the second surface.

The terms and words used in this description and claims are not limited to the bibliographical meanings, but, are merely used to enable a clear and consistent understanding of the disclosure. It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

What is claimed is:

1. A radiation detector comprising:
a housing having a first image cover associated with a first surface configured to receive incident radiation generated at a first voltage range, and a second image cover associated with a second surface configured to receive incident radiation generated at a second voltage range, wherein the first voltage range is greater than the second voltage range;
a scintillator disposed within the housing and configured to convert the incident radiation at the first voltage range or the incident radiation at the second voltage range into converted optical photons;
a photosensor array optically interfaced with the scintillator and configured to receive the optical photons from the scintillator in a same direction for both the first voltage range and the second voltage range; and
a first converter configured to interact with the incident radiation generated at the first voltage range.

2. The radiation detector of claim 1, wherein the first converter is comprised of a material having an atomic number and dimensions such that the first converter interacts with the incident radiation generated at the first voltage range so as to increase the dose capture efficiency of the scintillator at the first voltage range.

3. The radiation detector of claim 2, wherein the first converter comprises copper, molybdenum, or lead.

4. The radiation detector of claim 3, wherein the first converter comprises copper and the first converter is between 0.001 and 4 millimeters thick.

5. The radiation detector of claim 1, further comprising a baseplate configured to interact with the incident radiation generated at the second voltage so as to minimize attenuation of the energy of the incident radiation and provide structural support to the photosensor array.

6. The radiation detector of claim 5, wherein the baseplate comprises carbon fiber, polymer, aluminum, or magnesium, and is between 0.001 and 5 millimeters thick.

7. The radiation detector of claim 1, wherein the first image cover comprises carbon fiber, polymer, aluminum, or magnesium, and is between 0.001 and 5 millimeters thick.

8. The radiation detector of claim 1, wherein the second image cover comprises carbon fiber, polymer, aluminum, or magnesium and is between 0.001 and 5 millimeters thick.

9. The radiation detector of claim 1, further comprising amplifying and encoding electronics positioned on at least one circuit board proximate the photosensor array.

10. The radiation detector of claim 9, further comprising shielding components configured to shield the circuit board from X-ray radiation.

11. The radiation detector of claim 10, wherein the shielding components are positioned on two sides of the circuit board to shield the circuit board from X-ray radiation received through both the first image cover and the second image cover.

12. A radiation detector comprising:
a housing having a first surface and a second surface;
a scintillator disposed within the housing and configured to convert incident radiation at a first energy range and the incident radiation at a second energy range into converted optical photons;
a photosensor array optically interfaced with the scintillator and configured to receive the optical photons from the scintillator; and
a first converter configured to interact with the incident radiation generated at the first energy range;
wherein incident radiation generated at a first energy range is received through the first surface, incident radiation generated at a second energy range is received through the second surface, the first energy range is different than the second energy range, and the photosensor array receives the optical photons from the scintillator in a same direction for both the first energy range and the second energy range.

13. The radiation detector of claim 12, wherein the first converter is comprised of a material having an atomic number and dimensions such that the first converter interacts with the incident radiation generated at the first energy range so as to increase dose capture efficiency of the scintillator at the first energy range.

14. The radiation detector of claim 12, further comprising a baseplate configured to interact with the incident radiation generated at the second energy range in a manner so as to minimize attenuation and provide structural support to the photosensor array.

15. The radiation detector of claim 14, wherein the baseplate comprises carbon fiber, polymer, aluminum, or magnesium.

16. A radiation detector for detecting incident radiation in a megavolt voltage range from one side and incident radiation in a kilovolt voltage range from another side, the radiation detector comprising:
- a housing having a first surface and a second surface;
- a scintillator disposed within the housing and configured to convert the incident radiation at the megavolt voltage range and the incident radiation at the kilovolt voltage range into converted optical photons;
- a photosensor array optically interfaced with the scintillator and configured to receive the optical photons from the scintillator; and
- a first converter configured to interact with the incident radiation generated at the megavolt voltage range;
- wherein incident radiation generated at the kilovolt voltage range is received through the first surface, incident radiation generated at the megavolt voltage range is received through the second surface, and the photosensor array receives the optical photons from the scintillator in a same direction for both the megavolt voltage range and the kilovolt voltage range.

17. The radiation detector of claim 16, wherein the first converter is comprised of a material having an atomic number and dimensions such that the first converter interacts with the incident radiation generated at the first voltage range so as to increase the dose capture efficiency of the scintillator at the first voltage range.

18. The radiation detector of claim 16, wherein the first image cover or the second image cover comprises carbon fiber and is between 0.001 and 5 millimeters thick.

19. The radiation detector of claim 16, further comprising amplifying and encoding electronics positioned on at least one circuit board proximate the photosensor array.

20. The radiation detector of claim 19, further comprising shielding components configured to shield the circuit board from X-ray radiation.

21. The radiation detector of claim 16, wherein the scintillator is positioned between the first converter and the photosensor array, the first converter is positioned between the scintillator and the second surface that receives the incident radiation generated at the megavolt voltage range, and the first converter increases the dose capture efficiency of the scintillator by the capture of scatter electrons during megavolt voltage range imaging.

* * * * *